US011220045B2

(12) United States Patent
Bartos

(10) Patent No.: US 11,220,045 B2
(45) Date of Patent: Jan. 11, 2022

(54) APPARATUS AND METHOD FOR MANUFACTURING A THREE-DIMENSIONAL OBJECT

(71) Applicant: Márton Bartos, Budapest (HU)

(72) Inventor: Márton Bartos, Budapest (HU)

(73) Assignee: GRANTE Antenna Fejlesztôés Gyártó Zrt.

( * ) Notice: Subject to any disclaimer, the term of this patent is extended or adjusted under 35 U.S.C. 154(b) by 302 days.

(21) Appl. No.: 15/752,318

(22) PCT Filed: Aug. 11, 2016

(86) PCT No.: PCT/HU2016/000053
§ 371 (c)(1),
(2) Date: Feb. 13, 2018

(87) PCT Pub. No.: WO2017/029529
PCT Pub. Date: Feb. 23, 2017

(65) Prior Publication Data
US 2019/0047212 A1    Feb. 14, 2019

(30) Foreign Application Priority Data

Aug. 14, 2015 (HU) .................................. P1500374

(51) Int. Cl.
*B29C 64/135* (2017.01)
*B29C 64/153* (2017.01)
(Continued)

(52) U.S. Cl.
CPC ............ *B29C 64/135* (2017.08); *B28B 1/001* (2013.01); *B29C 64/153* (2017.08); *B33Y 10/00* (2014.12)

(58) Field of Classification Search
CPC ...... B29C 64/135; B29C 64/153; B28B 1/001
See application file for complete search history.

(56) References Cited

U.S. PATENT DOCUMENTS 5,122,441 A    6/1992 Lawton et al.
2005/0248061 A1    11/2005 Shkolnik et al.
(Continued)

FOREIGN PATENT DOCUMENTS

DE    4125534 A1    2/1993
DE    102009020987 A1    11/2010
(Continued)

OTHER PUBLICATIONS

International Searching Authority, Search Report and Written Opinion issued in International Application No. PCT/HU2016/000053 dated Apr. 1, 2017 (11 pages).

*Primary Examiner* — Jacob T Minskey
*Assistant Examiner* — Jennifer A Kessie
(74) *Attorney, Agent, or Firm* — Wood Herron & Evans LLP

(57) ABSTRACT

The invention is an apparatus for manufacturing a three-dimensional object, comprising a radiation emission arrangement adapted for generating a grow radiation pattern, a container adapted for receiving a build base material solidifying under the effect of irradiation by the grow radiation pattern, and fixing means (12) adapted for holding a build base adapted for dividing the container into a first container part (11*a*) and a second container part (11*b*), the build base having a first grow side facing the first container part (11*a*) and a second grow side facing the second container part (11*b*). The radiation emission arrangement comprises a first radiation emission unit (10*a*) adapted for generating a first grow radiation pattern allowing of growing the build base from the first grow side and a second radiation emission unit (10*b*) adapted for generating a second grow radiation pattern allowing of growing the build base from the second grow side. The invention is, furthermore, a method for manufacturing a three-dimensional object.

27 Claims, 7 Drawing Sheets

(51) Int. Cl.
B33Y 10/00 (2015.01)
B28B 1/00 (2006.01)

(56) References Cited

U.S. PATENT DOCUMENTS

| | | | |
|---|---|---|---|
| 2007/0075458 A1* | 4/2007 | Wahlstrom | B29C 64/135 |
| | | | 264/401 |
| 2009/0289384 A1 | 11/2009 | Maalderink et al. | |
| 2011/0293771 A1 | 12/2011 | Oberhofer et al. | |
| 2013/0056910 A1* | 3/2013 | Houbertz-Krauss | ........................ |
| | | | B29C 64/135 |
| | | | 264/401 |

FOREIGN PATENT DOCUMENTS

| | | |
|---|---|---|
| JP | 07304105 | 11/1995 |
| WO | 2014126837 A2 | 8/2014 |

\* cited by examiner

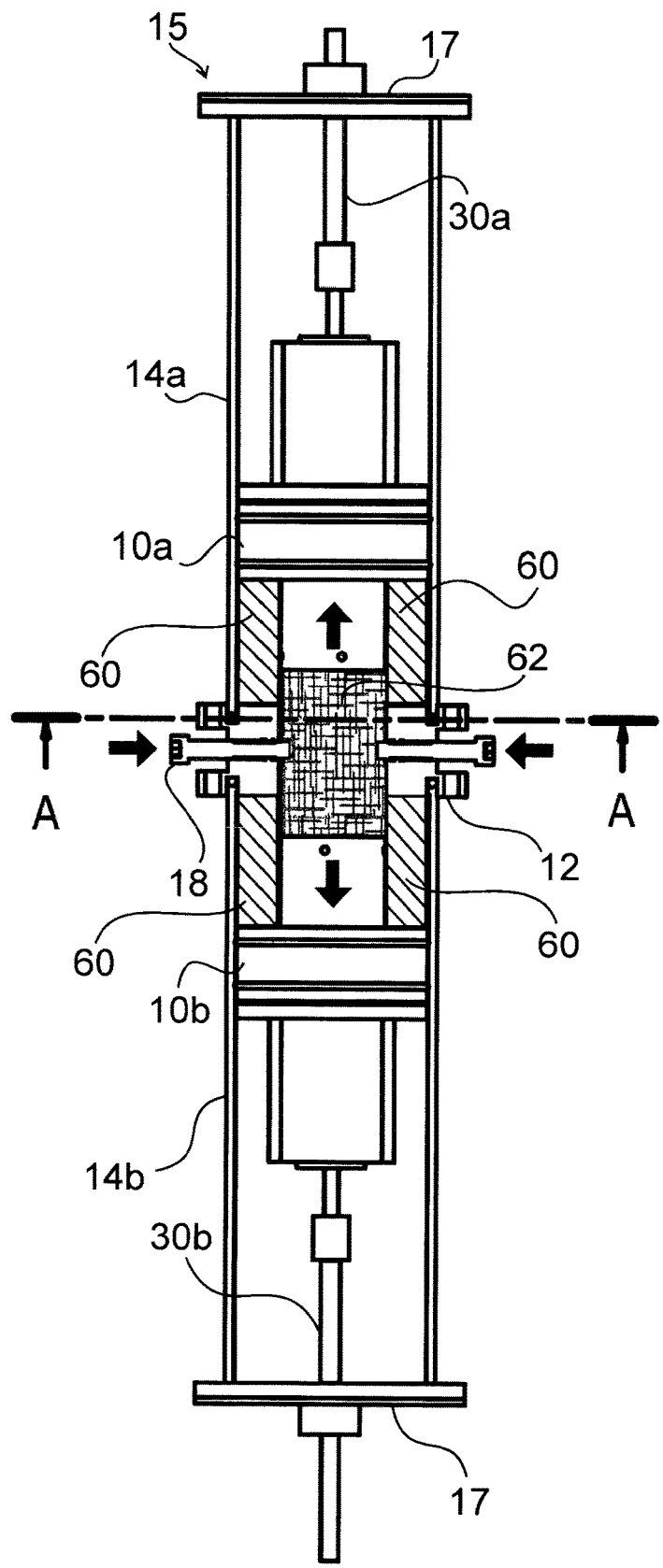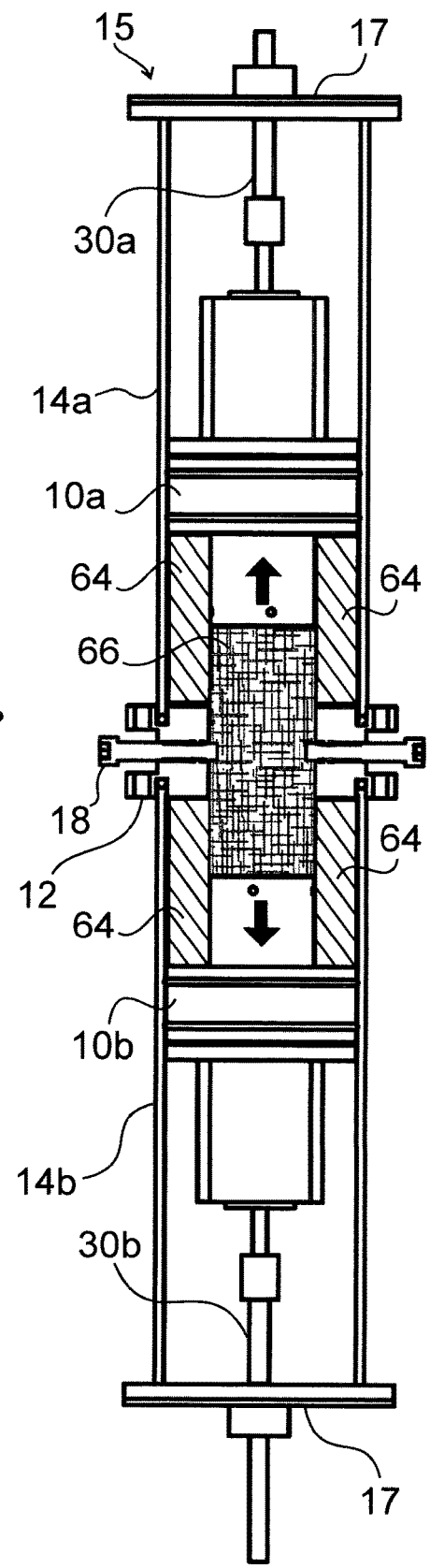
Fig. 9                    Fig. 10

APPARATUS AND METHOD FOR MANUFACTURING A THREE-DIMENSIONAL OBJECT

TECHNICAL FIELD

The invention relates to an apparatus and a method for manufacturing a three-dimensional object.

BACKGROUND ART

Nowadays, a number of different three-dimensional printing (additive manufacturing) technologies are known. One of the known three-dimensional printing technologies is the so-called SLA (stereolitography) technology, where a photosensitive base material, typically a liquid synthetic resin (photopolymer) is applied, which solidifies when exposed to light.

SLA apparatuses can be classified into two typical arrangement variants. The first of these is the so-called "bottom up" arrangement, where the printed geometry is attached to an object carrier mounted upside down, and is lifted upwards from the resin bath. The second type of arrangement is the so-called "top down" arrangement, according to which the printed geometry is attached at its base to an object table, and together with it is submerged into a tank filled with photopolymer or other material adapted to solidify when exposed to light. A light source has to be applied in case of both arrangements, the light source being adapted for projecting or otherwise imaging the radiation pattern (irradiation pattern) corresponding to a given cross-section to the photopolymer or the other material applying a digital imaging method, for example DLP (digital light processing) or the so-called laser galvo method. Imaging and consequently the solidification of the base material is therefore carried out at the boundary layer of the liquid base material. In the laser galvo method the light of a laser diode is projected using positioning by mirrors. In the so-called "bottom up" arrangements the radiation (light) arrives from the bottom to the printed geometry to be grown, while in the so-called "top down" arrangement light is incident thereon from above.

A "bottom up" arrangement is disclosed in the document with publication number WO 2014/126 837 A2. In the method disclosed in the document a radiation emission arrangement adapted for generating a radiation pattern and a container for receiving a base material solidifying under the effect of irradiation by the grow radiation pattern are applied. In the arrangement disclosed in the document irradiation arrives from below, passing through a transparent build surface. At the side of the build surface that faces the container holding the base material (laying opposite the direction of incidence of the radiation) a so-called dead zone is arranged. The dead zone prevents the printed object produced as a result of solidification from adhering to the grow surface. The printed object is continuously moved away from the build surface with the help of a carrier. The end of the object to be printed that lays closest to the build surface solidifies under the effect of the radiation, and thus the object is gradually built and finally completed. This solution has the disadvantage that—compared to other known approaches—it cannot increase the speed of three-dimensional printing (additive manufacturing) to a sufficient extent.

In light of the known solutions a need has arisen particularly for further increasing the build speed of three-dimensional printing (additive manufacturing) technologies so that the three-dimensional objects can be built faster. This demand is also supported by the fact that currently the most serious technological limitation of three-dimensional printing methods is speed (it is their speed for which these methods are most often criticized by their users).

DESCRIPTION OF THE INVENTION

The primary object of the invention is to provide an apparatus and a method for producing a three-dimensional object which are free from disadvantages of prior art approaches to the greatest possible extent.

The further object of the invention is to provide an apparatus and method for producing three-dimensional objects with which build speeds exceeding the build speeds provided by known technologies can be achieved for building three-dimensional objects.

The objects of the invention have been achieved by the apparatus according to claim 1 and the method according to claim 18. Preferred embodiments of the invention are defined in the dependent claims.

BRIEF DESCRIPTION OF THE DRAWINGS

Preferred embodiments of the invention are described below by way of example with reference to the following drawings, where FIG. 9 is a schematic side view illustrating a third stage of the method according to the invention carried out by means of the apparatus shown in FIG. 1, FIG. 10 is a schematic side view illustrating a fourth stage of the method according to the invention carried out by means of the apparatus shown in FIG. 1.

MODES FOR CARRYING OUT THE INVENTION

Figure 1:
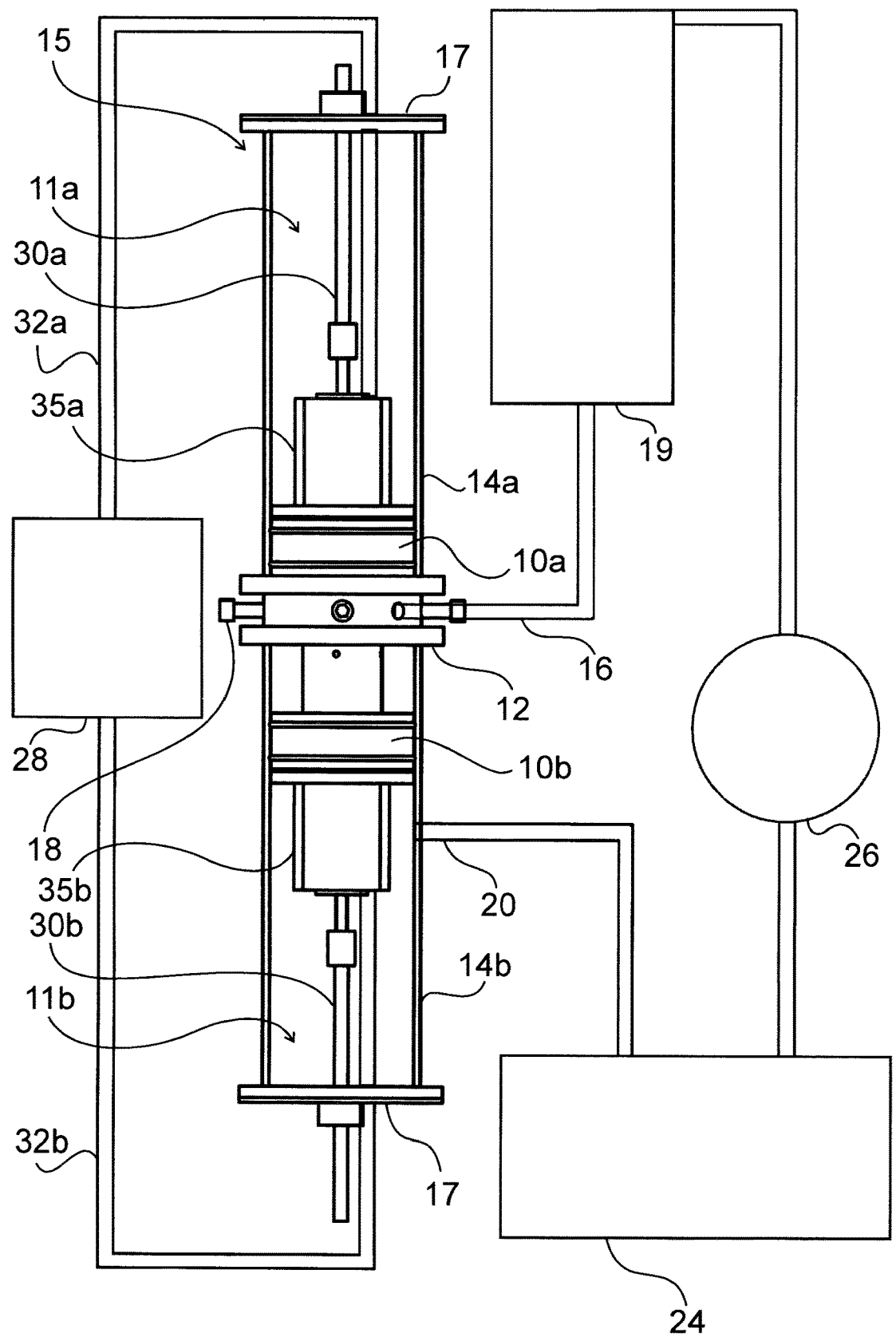
FIG. 1 is a schematic side view illustrating an embodiment of the apparatus according to the invention.

The apparatus according to the invention is adapted for manufacturing a three-dimensional object; an embodiment of the apparatus according to the invention is illustrated in FIG. 1. The apparatus comprises a radiation emission arrangement (radiation emitting arrangement) adapted for generating a grow radiation pattern and a container for receiving a build base material solidifying under the effect of irradiation by the grow radiation pattern.

Accordingly, the build base material solidifies under the effect of a grow radiation pattern generated by the radiation emission arrangement; by way of example the build base material can be liquid plastic material that can be solidified by irradiation with a grow radiation pattern, or a photosetting synthetic resin, e.g. a photopolymer. The viscosity of the applied synthetic resin is typically 30-150 cP (1 cP=0.001 Pa·s). A build base material with much higher viscosity can also be applied (the full suitable viscosity range is 1-1000 cP). Due to their low travel speed, high-viscosity materials are not suited for application in known apparatuses, since the known methods apply systems comprising open build base material containers (the container is open at one side in both the "bottom up" and the "top down" technology). In contrast to that, in an embodiment the apparatus according to the invention comprises a closed build base material container, where a volume fillable from a container part separated from the other container part or from both container parts is separated, with the build base material being prevented from escaping from the fillable volume. In this case, provided that the build base material is supplied applying additional material conveying means (i.e. it is pumped) it can be ensured even with exceedingly high-viscosity build base materials that the currently grown surface is submerged into the build base material. With a closed container—provided of course that the container parts can be put in communication—therefore it becomes possible to apply materials with particularly high viscosity as build base material.

In this case by "solidification under the effect of irradiation with the radiation pattern" it is meant that the liquid plastic is directly solidified with the radiation, i.e. for turning it from a liquid state into a solid state. In the literature of the field this technology is referred to as the SLA (stereolitography) technique.

The build base material may also be a powder-like material adapted to be entirely or partially (on its surface)—i.e. at least partially—melted, sintered, or activated by irradiation with the grow radiation pattern, and adapted to solidify after the irradiation has been finished, it is e.g. a coated powder (with the coatings typically being binders applied to the surface of metal, plastic or gypsum powder and are activated by sintering, facilitating the agglomeration of particles), a powder mixture (the mixtures typically being composite materials, e.g. fibre-reinforced (glass, carbon fibre) plastics or metal-plastic composites), plastic powder, metal powder or ceramic powder. In this case it may become necessary to apply additional material conveying means (pump, screw extruder) for introducing the build base material into the container parts (i.e. into the working space). In this context, by "solidification under the effect of irradiation with the grow radiation pattern" it is meant that the build base material is first melted, sintered or activated and later solidifies after irradiation is finished. In this case, therefore, irradiation is applied for liquefying, surface melting, or activating a component/components of the base material, and can provide that the build base material (powder-like base material) having been locally liquefied, partially melted or activated, solidifies at a predefined location. In this case the radiation pattern is generated (i.e. the portions to be solidified are irradiated) applying an SLS (selective laser sintering) method; this technique applies laser illumination for solidifying the build base material with the above described radiation pattern. As far as their operating principles are concerned, therefore, the SLA and the SLS technologies are similar.

In this embodiment the apparatus according to the invention further comprises a fixing means 12 (retaining means). The fixing means 12 is adapted for holding a build base. The fixing means 12 is arranged to be stationary with respect to the non-moving parts of the apparatus. This is also in order to provide that the parts of the apparatus that are movable relative to the build base are able to grow material at both sides of the stationary base (otherwise the build base would somehow have to be supported). The build base is adapted for dividing the container into a first container part 11a and a second container part 11b, and has a first grow side (i.e. a side which is to be grown) facing the first container part 11a and a second grow side facing the second container part 11b. The build base material may optionally flow (get) through the build base from one container part into the other; still, the build base is arranged between the two container parts and is adapted to divide the container constituted by the container parts.

Naturally, the container parts are configured in all embodiments in such a manner that a three-dimensional object can be grown/built inside them. The build base is arranged in the apparatus only when the method for manufacturing a three-dimensional object, to be described below, is about to be started, i.e. a build base is not arranged in the apparatus when it is out of operation.

In the apparatus according to the invention the radiation emission arrangement comprises a first radiation emission unit 10a adapted for generating a first grow radiation pattern allowing of (enabling) growing the build base from its first grow side and a second radiation emission unit 10b adapted for generating a second grow radiation pattern allowing of growing the build base from its second grow side. The radiation emission unit can also be termed a "head unit".

The three-dimensional object is grown in the apparatus according to the invention according to the SLA or SLS principle. Accordingly, the three-dimensional object is built through its grow sides. Since applying the apparatus according to the invention the three-dimensional object can be built simultaneously at two different grow sides, the apparatus according to the invention allows of the build speed of the three-dimensional object to exceed the speed provided by known approaches.

For building the object, the grow radiation pattern is generated—by the help of the permeable element described below—at the appropriate grow cross section. The grow radiation pattern is generated at such a position that it allows of the object to be built from the given grow side, i.e. that the build base material solidifies in such a position that the solidifying material remains attached to the already built portions of the three-dimensional object.

Applying a radiation pattern generated at the appropriate position, an appropriate pattern can be given to a subsequent portion of the three-dimensional object. The preferably computer-controlled and computer-generated radiation patterns applied one after the other are aligned with one another such the cross section of the three-dimensional object can be built appropriately. Thereby the three-dimensional object is built gradually with the substantially two-dimensional radiation pattern having a shape and imaging location that are changing at an appropriate pace.

The apparatus according to the invention can be applied for building the three-dimensional object both continuously and in a layer-by-layer fashion. In a number of known solutions object building is carried out by keeping the radiation emission unit stationary while a given layer is built, the radiation emission unit only being moved in order to solidify a further layer in such a manner that the side that has just been solidified can be grown further with the application of the grow cross section. According to the invention the three-dimensional object is built either by cross-section images (grow radiation patterns) corresponding to the subsequent layers that follow one another for time periods, or by a moving image generated from individual cross section images (this moving image is projected onto the build base material), while moving the radiation emission unit in an appropriate (ascending/descending) manner. In this case, therefore, the radiation emission unit performing object building is in continuous motion, and the cross-section instantly irradiated (illuminated) is coincident with the cross-section to be solidified. Irradiation time is highly dependent on the initiator (typically, photoinitiator) content of the build base material (i.e. on the quantity of solidification-inducing substance it comprises) and on the intensity of the radiation source (in specific cases, a light source). A layer with a thickness of 50 microns typically solidifies in approximately 0.1-30 seconds. To provide continuous object building, this value has to be taken into consideration when the speed at which the radiation source is moved is chosen. Of course, the base material supply also has to be ensured.

Since according to the invention object building is performed by way of example on the SLA principle, and thus during the grow process the three-dimensional object to be built is inside the container receiving the build base material, the object is typically completely surrounded by the build base material. Due to solidification occurring only at the appropriate locations, this build base material solidifies only at the desired locations (in grow cross sections).

In the present embodiment, the first radiation emission unit 10*a* comprises a first radiation source 34*a*, and the second radiation emission unit 10*b* comprises a second radiation source 34*b*. According to the invention the radiation emission units do not necessarily comprise dedicated radiation sources, i.e. such a solution may also be contemplated where in the apparatus according to the invention light emitted by a single radiation source is directed on the build base by the two radiation emission units. In this case, light emitted by the single radiation source can be directed to the first and second radiation emission units corresponding to the two grow sides by means of mirrors and other imaging means. However, as shown in the figures, in the present preferred embodiment, each radiation emission unit 10*a*, 10*b* has its own radiation source 34*a*, 34*b*. This is preferable because thereby the radiation emission units 10*a*, 10*b* have a self-sufficient configuration, i.e. their movement is not affected by an optical component (by way of example, optical cable) adapted for introducing the light of a common external light source.

The radiation emission units 10*a*, 10*b* preferably comprise an imaging apparatus implemented by way of example applying a DLP (Digital Light Processing) based device, an LCD (liquid crystal display), an LCOS (liquid crystal on silicon) device, a laser galvo type device (see above), a HTPS (high temperature poly-silicon) device, a CRT (cathode ray tube), an EBL (electron-beam lithography) device, etc.

The radiation emission units 10*a*, 10*b* will be described below referring to FIG. 3. In this embodiment the radiation emission units 10*a* and 10*b* can be brought near the fixing means 12 from above and from below, respectively.

In the apparatus according to the invention, therefore, the build base is adapted for dividing a container into two parts. This is also taken to mean that the build base is arranged between two (first and second) container parts. As it is apparent from this definition, in the apparatus according to the invention such build bases can also be applied which have grow sides not situated opposite one another. In that case the container parts are connected to these non-opposing sides. By way of example, a cylindrical wedge-shaped build base with grow sides laying at an angle with respect to one another is conceivable. In this case the apparatus according to the invention may be arranged such that the fixing means is also wedge-shaped, with container parts having cylindrical side walls being connected thereto as with the embodiment according to FIG. 1. Also, by way of example, such a rectangular block-shaped build base is conceivable of which two adjacent sides are grown instead of two opposite sides.

Such a build base is also conceivable of which more than one sides are grown simultaneously. In this case the additional grow sides have dedicated separate container parts and radiation emission units. Accordingly, in this embodiment, the fixing means is adapted for holding a build base being adapted for dividing the container into a first container part, a second container part and at least one additional container part and having, in addition to the first grow side and the second grow side, at least one additional grow side facing the at least additional container part, and the radiation emission arrangement further comprises at least one additional radiation emission unit adapted for generating at least one corresponding additional grow radiation pattern allowing of growing the build base from the at least one corresponding additional grow side. In this embodiment the first grow side and the second grow side are not situated opposite each other. In addition to that, the apparatus according to the invention comprises in any case two container parts and two radiation emission units (adapted for building the object at two separate grow sides).

Thereby—taking into account build bases having different shapes—the apparatus according to the invention can be utilized for simultaneously growing a build base at two different arbitrarily chosen sides. Therefore, with the apparatus according to the invention the application of the build base allows of at least double (or if there are more than one grow sides, even higher than that) "print" (grow) speed with respect to known approaches that grow the object to be built at a single given side. Naturally, utilizing build bases like the one to be described below—i.e. wherein the first and second grow sides of the build base are situated opposite each other (i.e. the two grow sides lay opposite each other)—is particularly preferable since thereby an object can be built starting from the middle and growing the object in two opposite directions. This can satisfy needs in the overwhelming majority of cases.

Figure 12:
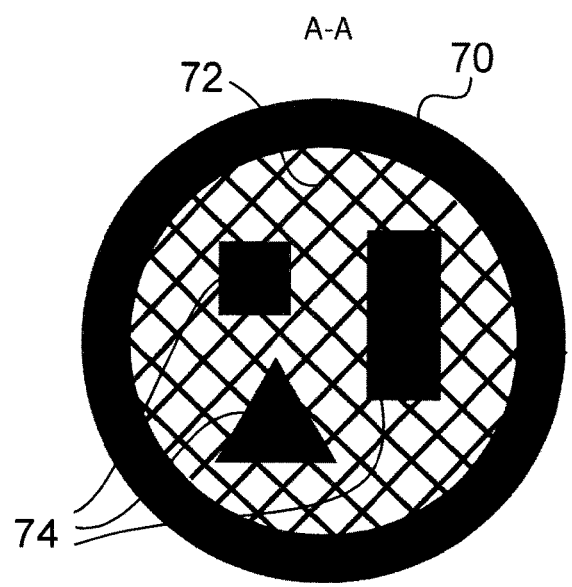
FIG. 12 is a schematic top view of an exemplary three-dimensional object manufactured by means of the apparatus according to the invention.

As it is shown below, the build base will preferably form an integral part of the object to be manufactured. Such a build base is illustrated in FIG. 12 in a top view. As shown in FIG. 12, such an object is utilized as a build base wherein the object sections 74 forming a part of the three-dimensional object to be manufactured are situated on the inner portion of the build base, with the object sections 74 being attached to a holding rim 70 by a grid 72. With such a build base, therefore, the three-dimensional object that is being built can be held via the holding rim 70.

To appropriately build the three-dimensional object a held build base is essentially required. This build base may also be manufactured by growing (as it is described in detail below), in which case the build base is preferably configured such that it already comprises the portions of the object that lay in the appropriate cross section. In case it is decided that such a build base is not to be utilized, a base plate can also be applied as a build base.

The build base is required in order that the three-dimensional object sections to be built on the build base can be grown on both sides. As it will be shown below, in case a build base manufactured by the apparatus itself is intended to be utilized, then the build base itself can only be grown at one side until it is finished since in this case the build base needs to be supported (precisely because in this case the build base itself cannot yet be held).

In the present embodiment the radiation emission units 10a, 10b are moved by means of a first actuating rod 30a and a second actuating rod 30b (pusher rods). As shown in the figure, a first drive 35a and a second drive 35b adapted for operating the respective actuating rods 30a, 30b corresponding to the radiation emission units 10a, 10b are arranged, at the top and at the bottom, on the radiation emission units 10a and 10b, respectively. The radiation emission units 10a, 10b can be moved by means of drives 35a, 35b. Each radiation emission unit 10a, 10b can be brought nearer to cover plates 17 arranged at the top and at the bottom by the dedicated drive 35a, 35b implemented, by way of example, applying stepper motors, servo motors, pneumatic or hydraulic cylinders (the threaded shafts [actuating rods or spindles] are driven through the threaded through bore [threaded socket] with a threading matching the threading of the shafts, with the through bore being situated outside the cover plate 17 according to FIG. 1, this solution is also called a "spindle arrangement"; and a shaft connecting element [shaft coupling element] is shown on the actuating rods 30a, 30b). With the help of the actuating rods 30a, 30b the drive 35a, 35b essentially pulls itself and the radiation emission units 10a, 10b closer to the cover plates 17.

Such an embodiment is also conceivable wherein the further components of the apparatus are arranged identically to the above described embodiments, but the drives corresponding to the radiation emission units are attached to the external face of the cover plates. The drive and the radiation emission unit are connected by an actuating rod also in this embodiment, allowing that the drive can move the corresponding radiation emission units. In such an embodiment the radiation emission unit is pulled closer to the cover plate by the drive unit by gradually driving the actuating rod through the drive unit (preferably, with the help of a threaded spindle and a threaded socket).

In the embodiment according to FIG. 1 container parts 11a and 11b are arranged at the two sides of the fixing means 12. In this embodiment the side walls 14a, 14b of the container parts 11a, 11b have cylinder mantle shapes, with the container parts 11a, 11b being attached to each other at one end by the fixing means 12. As shown also in FIG. 1, in this embodiment the radiation emission units 10a, 10b are adapted to be introduced into the container parts 11a, 11b from the direction of the other end of the container parts. With a fixing means having appropriate shape, even more container parts with cylinder mantle shaped or right prism mantle shaped side walls can be attached to the fixing means, i.e. these features can be generalized for more than two radiation emission units and container parts.

In the present embodiment both radiation emission units 10a, 10b are formed to separate a fillable volume (its useful volume) from the container part 11a, 11b corresponding thereto such that the build base material is prevented from escaping from the fillable volume. The useful volumes of the container parts 11a, 11b are therefore closed, respectively, from above and from below, by the radiation emission units 10a and 10b (it is shown in FIG. 1 that the cylindrical radiation emission units 10a, 10b are configured such that their widest portion is fitted tightly against the side walls 14a, 14b; as illustrated in FIG. 3 appropriately tight fitting is ensured also by a sealing ring 36 adapted to prevent liquids—or other build base material—from getting through it). In this embodiment, therefore, the size of the fillable volume of the container parts 11a, 11b, i.e. the volume into which build base material can be introduced from the direction of the fixing means 12, can be modified by moving the radiation emission units 10a, 10b. At a later stage of the build method, when the three-dimensional object adapted to be built on the build base retainable by the fixing means 12 is already higher, and consequently the radiation emission units 10a, 10b are sufficiently distanced from the fixing means 12, the fillable volume of the container parts 11a, 11b increases considerably with respect to its initial volume.

In a similar embodiment the side walls of the container parts can have a right prism mantle shape, in which case also the radiation emission units have a non-cylindrical shape that fits into the right prism mantle shape. The two parallel base sides of the right prism are congruent polygons, with the lateral sides being rectangles; the side walls of the container parts being constituted only by the mantle, i.e. the lateral sides. The side walls of the container parts are expediently cut in two along a vertical line, the two half-side walls being allowed to be opened up by adding appropriate hinges (in their closed state, the side walls of course constitute closed container parts also in this case).

The side walls 14a, 14b of the container parts 11a, 11b can, by way of example, be made of polymethyl methacrylate (commonly known as "plexiglass" ("acrylic glass")), a transparent material. Transparent side walls can be applied only in case the build base material is not sensitive to visible light. Even plexiglass side walls can be configured such that they are made UV-blocking, or—e.g. by colouring—their transparency can also be eliminated. According to the invention, by way of example UV light is applied as radiation, and accordingly such a build base material which is UV-sensitive, i.e. can be solidified by UV illumination.

Other figures show further details of the embodiment shown in FIG. 1, the internal components of an apparatus 15 shown in FIG. 1 will therefore be described in relation to the subsequent figures.

As shown in FIG. 1, in this embodiment the apparatus comprises a first base material container 19 connected via an inlet channel 16 adapted for filling the container parts 11a, 11b with the build base material, a second base material container 24 connected via a discharge channel 20 adapted for discharging the build base material from the container parts 11a, 11b, and a pump 26 adapted for feeding the build base material from the second base material container 24 into the first base material container 19, the pump being connected to the containers via respective channels. Build base material supply can be provided by including such base material containers 19, 24 and pumps. The build base material can also be supplied by other means. By arranging appropriate measurement devices it can preferably be provided that the rate of build base material resupply allows that the steadily increasing fillable volume of the container parts can always be completely filled up with base material.

By way of example, the pump can be a so-called peristaltic pump. As shown in FIG. 1, the inlet channel 16 is connected to the fixing means 12 and thus joins the container parts 11a, 11b. The internal structure of the fixing means 12 will be described in relation to FIG. 6, where the manner of introducing base material from the channel 16 into the container parts 11*a*, 11*b* (through a build material feed bore 50 passing through the fixing means 12) is also presented. In case a pump is not included, the build base material can also be resupplied manually.

In FIG. 1 there is also shown a compressor 28 connected to the radiation emission unit 10*a* through drive 35*a* by means of a first gas inlet channel 32*a* (the gas inlet channel 32*a* crosses the cover plate 17). Similarly, a gas inlet channel 32*b* connects the compressor 28 with the radiation emission unit 10*b*.

Figure 3:
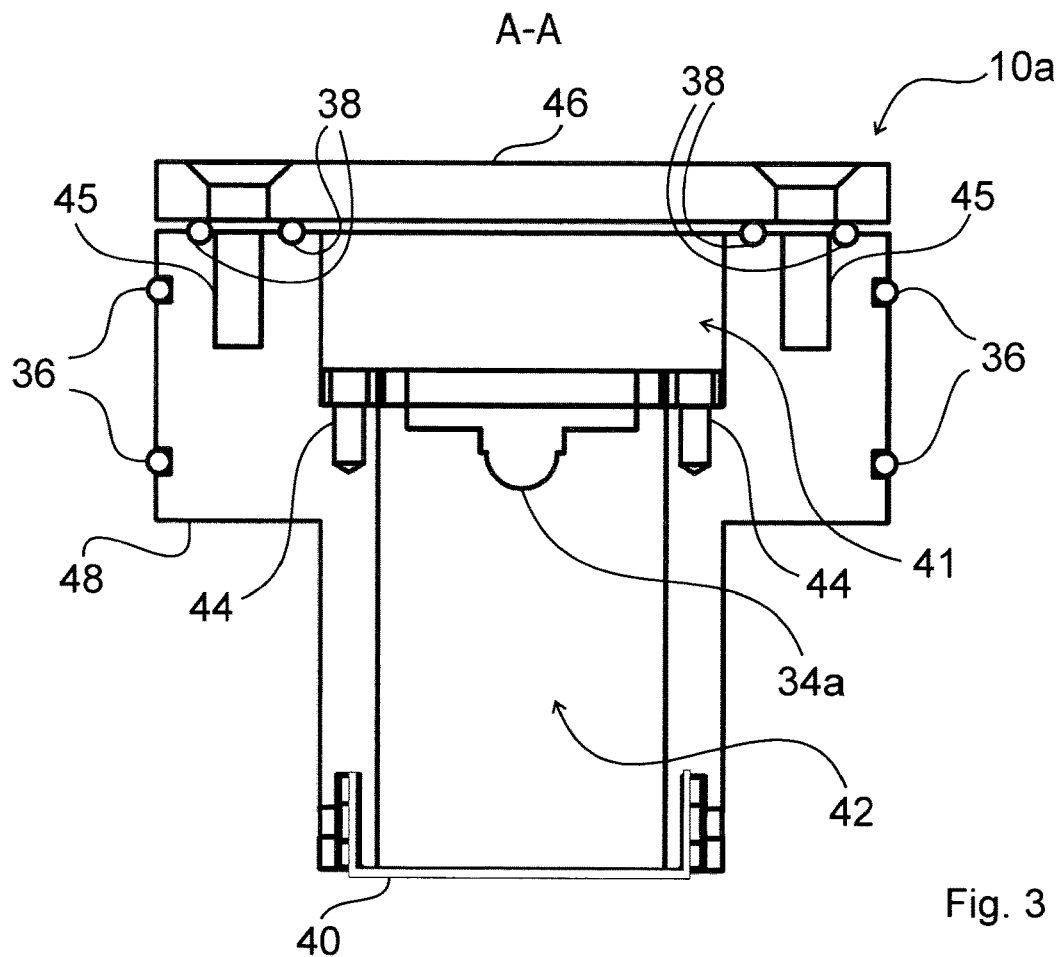
FIG. 3 is a schematic sectional view illustrating the radiation emission unit in an embodiment of the apparatus according to the invention.
Figure 4:
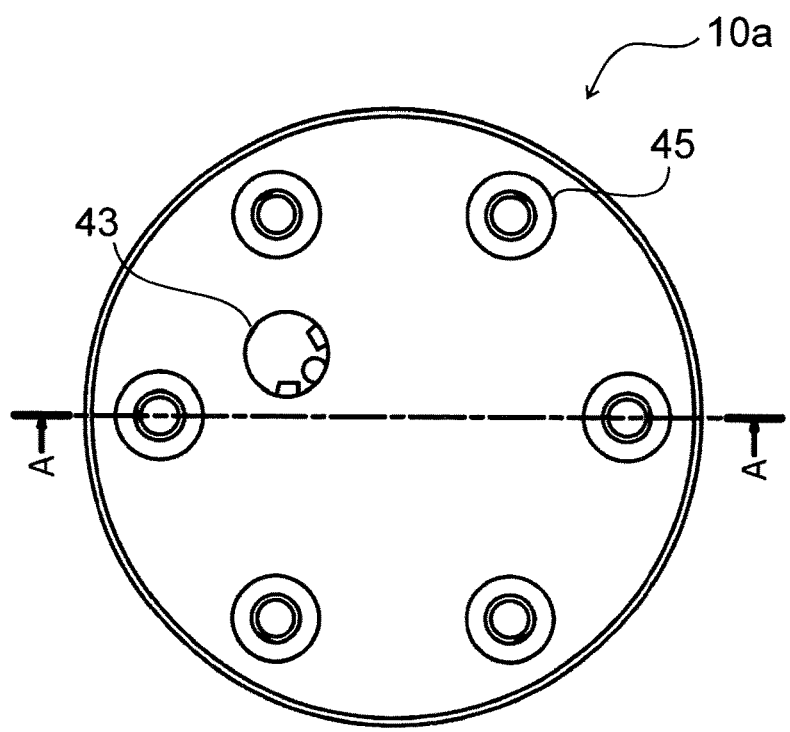
FIG. 4 is a top view illustrating the head section shown in FIG. 3.

In FIG. 3 there is shown the radiation emission unit 10*a*, and in FIG. 4 the top view of the same radiation emission unit 10*a* is shown. In FIG. 4 there can be seen an inlet opening 43 arranged on a lid 46 of the radiation emission unit 10*a*. The gas inlet channel 32*a* has to be connected into this inlet opening 43. The inlet opening 43 opens into an internal space 41 of the radiation emission unit 10*a*, from which an internal space 42 of the radiation emission unit 10*a* is separated by a support plate of the first radiation source 34*a*. The plate is secured inside the radiation emission unit by means of fixing elements 44 as shown in FIG. 3. In order that the two internal spaces 41 and 42 can be put in communication, the radiation source support plate 34*a* comprises perforations situated between the two internal spaces 41, 42. The role of overpressure is discussed below. The compressor 28 can thereby be applied for producing overpressure the internal spaces 41 and 42.

In the embodiment according to FIG. 1, the container parts 11*a*, 11*b* are connected to each other by means of an annular fixing means 12 being coaxial with the side walls 14*a*, 14*b* of the container parts 11*a*, 11*b*, and having a shape fitting to the shape of the side walls 14*a*, 14*b*. Furthermore, in the present embodiment, fixing pins 18 having a radial axis, and being adapted for fixing the build base inside the internal space of the fixing means 12 are arranged on the periphery of the fixing means 12. The fixing pins 18 may be implemented as mechanically actuated fixing pins, electromagnetic clamping blocks (these can preferably be automated), or fixing pins actuated by pneumatic or hydraulic cylinders.

Figure 2:
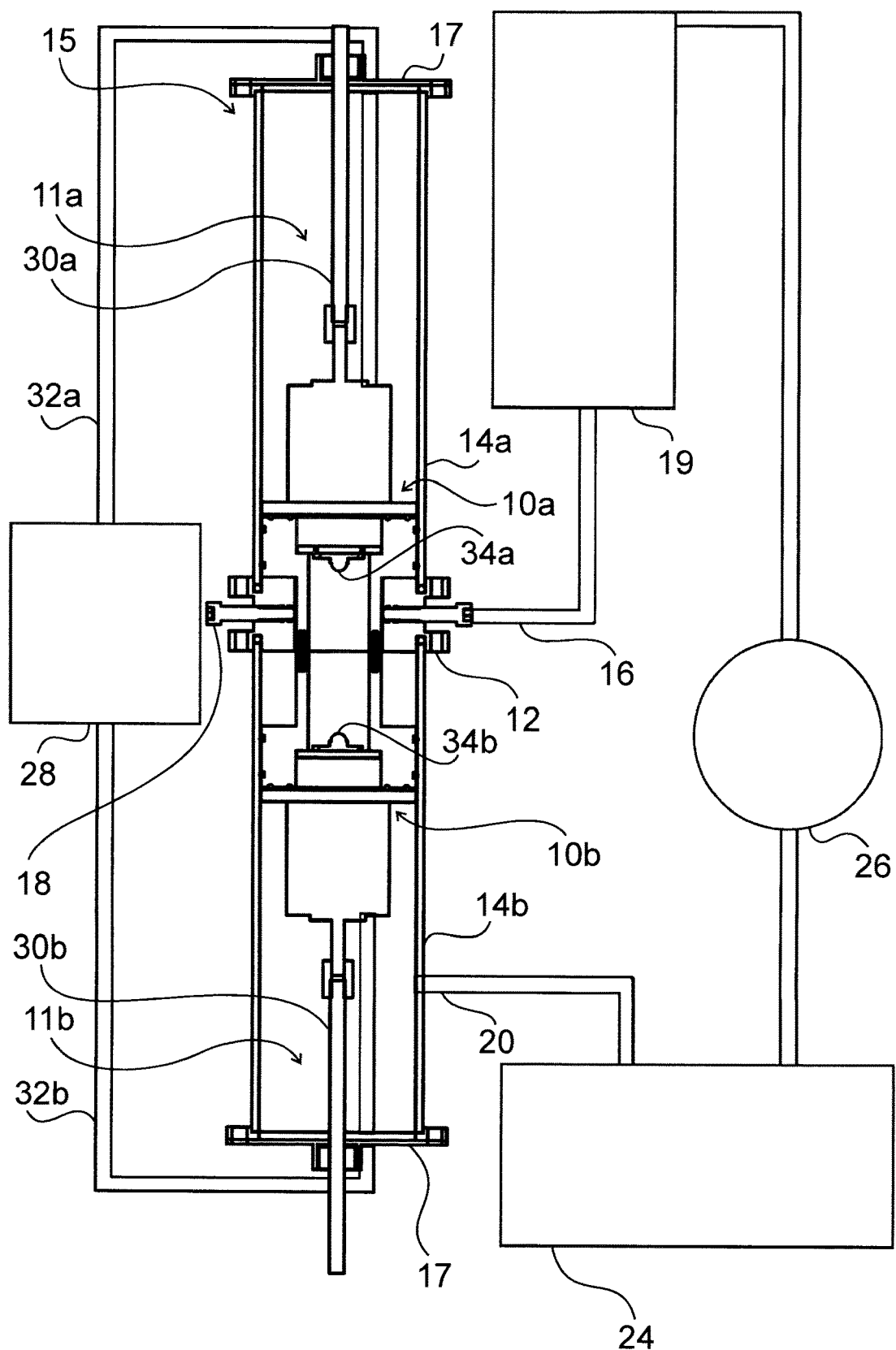
FIG. 2 is a schematic sectional view illustrating the embodiment of the apparatus according to the invention shown in FIG. 1.

FIG. 2 is a sectional drawing of the embodiment illustrated in FIG. 1. In this figure—in addition to what is shown in FIG. 1—there can in particular be observed the internal configuration of the radiation emission units 10*a*, 10*b*. A section view of the structure of the fixing means 12 can also be seen. As shown in FIG. 2, the radiation emission units 10*a*, 10*b* are pushed against each other, their position of contact being situated at the bottom edge of the fixing means 12. In FIG. 2 there is also shown that the fixing pins 18 arranged in the fixing means 12 may extend as far as the external surface of the part of the radiation emission unit 10*a* that extends into the internal space of the fixing means 12. According to the figure, in this embodiment the height of the part of the radiation emission unit 10*a* extending into the internal space of the fixing means 12 is the same as the height of the fixing means 12. Embodiments wherein the extending portion is higher are also conceivable.

In FIG. 3 the radiation emission unit 10*a* is shown in the same view that is shown in FIG. 2. In FIG. 3 the configuration of the radiation emission unit 10*a* is shown. As shown in the figure, the radiation emission unit 10*a* comprises a head 48 and a lid 46. The lid 46 can be attached to the head 48 applying fixing elements inserted into fixing element bores 45. The fixing element bores 45 are also shown in FIG. 4 which shows a top view of the radiation emission unit 10*a*. Between the lid 46 and the head 48 sealing rings 38 are arranged in such a manner that one sealing ring 38 is arranged at an inner circumference relative to the fixing element bores 45, while another sealing ring 38 is arranged at a more outer circumference relative to them. For this configuration large-sized sealing rings should be utilized, but such configurations may also be conceived wherein a separate small-sized sealing ring corresponds to each attachment bore.

As shown in FIG. 3, there are sealing rings 36 arranged about the wide part of the head 48, i.e. in this embodiment sealing rings 36 providing sealing between the radiation emission units 11*a*, 11*b* and the container parts 10*a*, 10*b*, preventing the build base material from escaping from the fillable volume are arranged on the side walls of the radiation emission units 10*a*, 10*b*, the side walls fit to the container parts 11*a*, 11*b*.

In FIG. 3 the radiation emission unit 10*a* is illustrated in such an embodiment wherein the radiation emission unit 10*a* fits inside the first container part 11*a*, i.e. it can be slid inside it. With such a configuration the purpose of the sealing rings 36 is to prevent the build base material from escaping from the fillable volume of the container part situated between the radiation emission unit 10*a* and the fixing means 12, and from entering the region situated above the radiation emission unit 10*a*. Naturally, in this embodiment a sealing ring is also arranged around the radiation emission unit 10*b*. This is preferable because if the build base material could enter that region then a large amount of material might leak as far as the lid 17—especially at the bottom connection—which would necessitate that a substantially larger amount of build base material is fed to the apparatus in order that by way of example the bottom radiation emission unit 10*b* can be fully immersed in the base material (i.e. that the base material can cover also the permeable element 40 thereof). Accordingly, due to the container parts 11*a*, 11*b* being arranged above each other the sealing ring arranged about the bottom radiation emission unit 10*b* has an especially important role. Optionally, the effect of the sealing ring can at least partially be ensured also by a shape-fit configuration.

In the present embodiment of the apparatus according to the invention, therefore, a sealing ring providing sealing between the radiation emission units 10*a*, 10*b* and the container parts 11*a*, 11*b* is arranged on the side walls of the radiation emission units 10*a*, 10*b* fitting to the container parts 11*a*, 11*b*.

In the embodiment shown in FIG. 3, each of the radiation emission units 10*a*, 10*b* comprises a permeable elements 40 being arranged between the corresponding radiation source 34*a*, 34*b* and the corresponding grow side, being adapted for letting through radiation emitted by the corresponding radiation source 34*a*, 34*b*, being adapted for determining imaging location of the grow radiation pattern, being adapted for inhibiting or can be made to inhibit the adhesion of the build base material to its side facing the corresponding grow side. Furthermore, in the present embodiment the radiation emission unit 10*a* is arranged in the first container part 11*a* such that it is movable in a direction perpendicular to the first grow side corresponding thereto, and the second radiation emission unit 10*b* is arranged in the second container part 11*b* such that it is movable in a direction perpendicular to the second grow side corresponding thereto, such that they are movable relative to the respective grow sides and can be moved away therefrom during the grow process in accordance with the build speed (as more and more material is built on the grow sides).

The permeable element 40 is arranged between a given radiation source and the corresponding grow side, i.e. the radiation emitted by the radiation source passes through the permeable element 40 that lets through this radiation because the permeable element 40 is permeable to this radiation.

In embodiments wherein the radiation emission units comprise permeable elements, the location to which the radiation pattern is imaged is determined by the permeable elements. In such embodiments the radiation pattern is not generated at an arbitrary cross section, for example at the surface of a radiation-sensitive liquid, but rather at the side of the permeable elements that faces the grow side. For generating the appropriate radiation pattern the radiation emission unit is pushed on the already completed portion of the three-dimensional object, and thereby the radiation pattern imaged by the permeable element is suitable for solidifying a subsequent portion of the three-dimensional object, i.e. for building the object. To achieve that, base material is of course introduced between the permeable element and the already completed portions of the three-dimensional object.

It is noted here that the radiation emission units according to the invention are applied for solidifying the build base material not in a layer-by-layer fashion but by continuously modifying the grow radiation pattern and simultaneously moving the radiation emission units. It is preferred positioning the grow cross section as discussed above because thereby it is ensured that building is always carried out at a surface region of the build base material (i.e. that there is no not-to-be-solidified build base material region that would be situated between the radiation source and the grow cross section and thus could undesirably solidify under the effect of the radiation passing through it). As spelled out below, it is also ensured that the solidifying base material only adheres to the already existing portions of the three-dimensional object to be built and not to the surface of the permeable element.

The sides of the permeable elements that face the grow sides are arranged such that they can inhibit or can be made to inhibit the adhesion of the build base material. In an embodiment wherein the permeable element itself inhibits the adhesion of the build base material, the permeable element has to be made of an anti-adhesion material. The anti-adhesion material may e.g. be polydimethylsiloxane (a silicone material with excellent hydrophobic characteristics that can be made superhydrophobic by further treatment), teflon foil, and other hydrophobic (contact angle greater than 90°) and superhydrophobic (contact angle greater than 150°) materials.

In other embodiments, such as the one shown in FIG. 3, the permeable element 40 can be made to inhibit the build base material from adhesion. To achieve that, in the present embodiment the permeable element 40 is made of a substance permeable to a separator gas (detaching gas), and an internal volume 42 adapted for receiving a pressurized separator gas is arranged between the radiation source and the permeable element. In such an embodiment the separator gas is preferably oxygen, but other gases, e.g. compressed air, can also be utilized as separator gas. As illustrated also in FIG. 1, gas can be introduced into the first radiation emission unit 10a through an inlet opening 43 for generating overpressure in the internal spaces 41 and 42. The gas (preferably oxygen) percolates through the permeable element 40 and settles on its outside surface that faces the grow side. These molecules, together with the gas molecules that have been let through by the permeable element 40 prevent the build base material from adhering to the element's surface. Thereby, practically a dead layer is formed, the gas molecules providing that the build base material about to constitute a part of the three-dimensional object is separated from the permeable element 40 and solidifies on top of the already existing portion of the three-dimensional object.

In order that the gas held in the internal space of the radiation emission unit 10a can percolate through the permeable element 40, overpressure has to be established in the internal space. The overpressure can be established through the inlet opening 43, the value of the overpressure is approximately 0.2-2 bar, typically approximately 1.5 bar. To maintain overpressure, the separator gas is let through by the permeable element 40 only to a small extent in order that no significant pressure drop can occur in the internal space 42.

The gas held in the internal space 42 in an overpressurized state does not affect the operation of the radiation source 34a; the rays emitted by the radiation source 34a penetrate the internal space 42 unhindered. Since according to the above the internal spaces 41 and 42 are in communication, both internal spaces become overpressurized (the sealing rings 38 are included to maintain overpressurization). The separator gas is forced through the permeable element 40 under this pressure.

The permeable element is preferably implemented as a membrane both in the case it is made of an anti-adhesion material inhibiting the adhesion of the build base material in itself and in the case the permeable element can be made to inhibit the adhesion of the build base material. The thickness of the membrane is in the range of 0.025-1 mm, by way of example it is 0.4 mm. By way of example, the membrane is made of silicone. In case the separator gas is oxygen, the membrane can be made of highly oxygen-permeable silicone. It can also be conceived that permeable elements that are made of an anti-adhesion material and that can be made to inhibit adhesion are applied in combination in the same apparatus.

The configuration according to FIG. 3 allows that by removing the fixing elements from the fixing element bores 45 the lid 46 can be removed and the radiation source 34a can be replaced (in case it has reached the end of its service life) through the opening thus opened. This configuration also has this additional advantage.

In the embodiment illustrated in the figures the fixing means is adapted for holding the build base with respect to the apparatus in a horizontal position such that the grow sides of the build base face upwards and downwards. In the present embodiment, therefore, the build base is arranged horizontally, with the object being grown in upwards and downwards directions.

As it will be spelled out in detail below, in this embodiment of the invention the first and second container parts 11a, 11b are completely filled up with the liquid build base material applied in the present embodiment, and thus the build base and together with it the entire apparatus could also be arranged at an angle or even horizontally. With a horizontal arrangement of the apparatus the build base would be oriented vertically. The only thing that has to be ensured is that during the build process the build base material covers the outermost build surface of the three-dimensional object (i.e. it should be present over the entire surface) so that the build base material can solidify on top of the surface under the effect of the radiation pattern. If immersion is not ensured, then in an undesirable event it might happen that the radiation pattern would grow the three-dimensional object only partially (at the locations where the build base material is present), i.e. there would be such portions that would not be grown further. This would result in a structural deterioration of the three-dimensional object.

Figure 5:
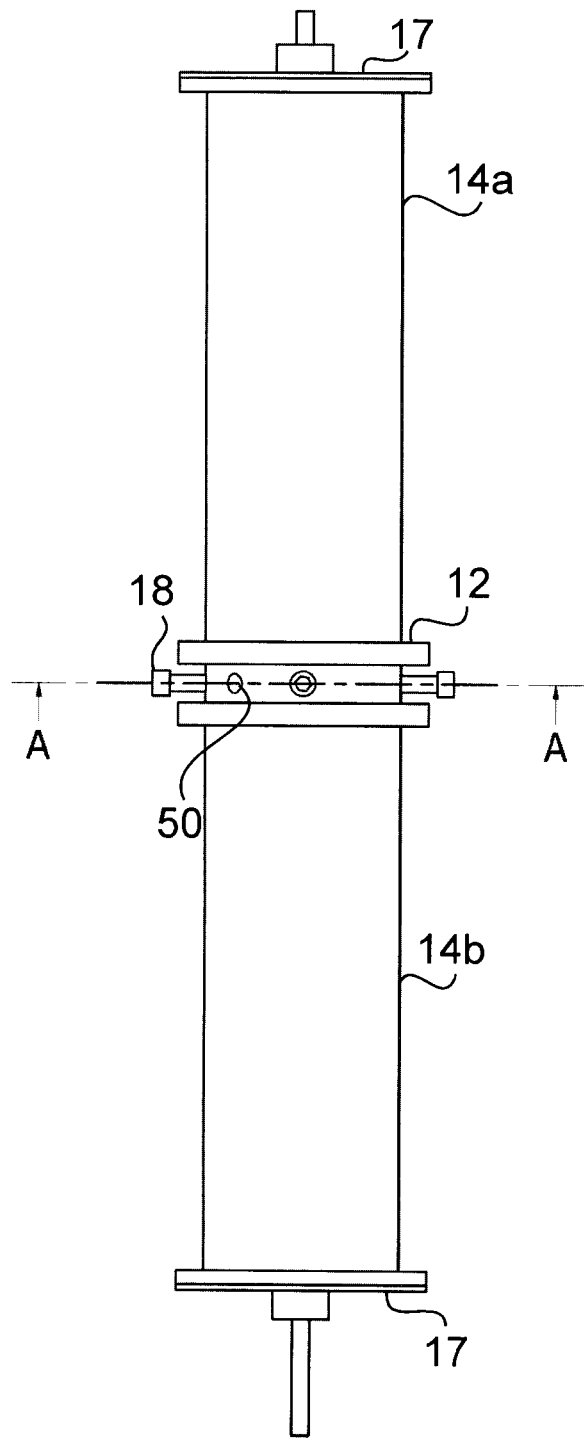
FIG. 5 is a side view illustrating an embodiment of the apparatus according to the invention.

In FIG. 5 the embodiment of the apparatus according to the invention illustrated in the above figures is shown in side view such that the components situated inside the side walls 14a, 14b cannot be seen. The manner in which the fixing means 12 is arranged between the side walls 14a, 14b can be observed also in this figure.

Figure 6:
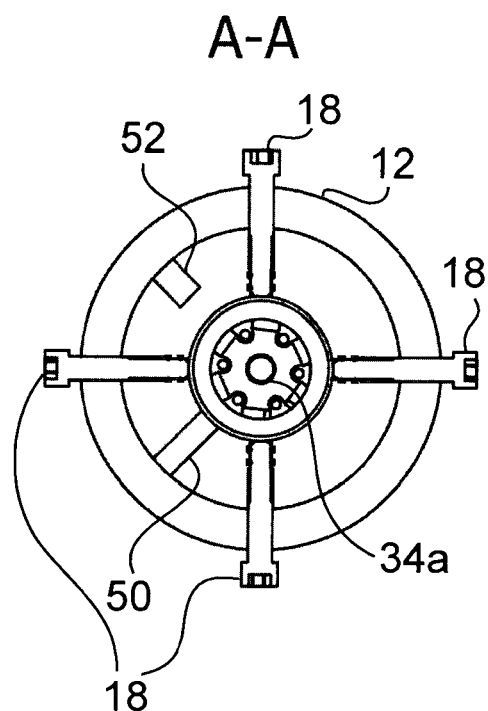
FIG. 6 is a schematic top plan illustrating the fixing means of the embodiment shown in FIG. 5.

The base material feed bore 50 arranged on the fixing means 12 is shown in FIG. 5, which bore is arranged at a different radius than the fixing pins 18. In FIG. 6 the arrangement of the base material feed bore 50 can be seen more clearly.

FIG. 6 shows the section of FIG. 5, showing the fixing means 12 and the fixing pins 18 that extend through the fixing means 12 and into a cylindrical internal spatial region. Since FIG. 6 is a section of FIG. 5 taken along the line A-A, the radiation source 34a is also shown in the internal space. As can be observed in FIG. 2, the portion of the radiation emission unit 10a which also comprises the radiation source 34a extends into this internal space of the fixing means. Considering the present FIG. 6 it will be understood that the build base material is introduced in between the fixing element 12 and the radiation emission unit 10a by the base material feed bore 50 passing through the fixing means 12. The portion of the radiation emission unit 10a that extends into the internal space of the fixing means 12 preferably has approximately the same width as the internal space itself, because this ensures that printing can be carried out at the largest possible surface area. However, for the above reasons a small gap has to be present between the portion extending into and the fixing means 12. Of course, the build base material can be fed into the container parts not only through the fixing means 12 and not only in the manner illustrated in the figures, implying that such an embodiment can also be conceived wherein no gap is included for the build base material (there is only a minuscule gap between the portion extending into and the inside edge of the fixing means that ensures that they do not stick together, i.e. that they can be moved easily relative to each other).

In FIG. 6 the outer rim of the fixing means 12 is shown which can also be observed in FIG. 5. This outer rim is not crossed by the build material feed bore 50, with a fixing bore 52 also being directed inwards starting from the inside edge of this outer rim. The fixing means 12 can be fixed via the attachment bore 52 by way of example to an external support structure that is adapted to keep the apparatus according to the invention in a fixed position. The build base material is therefore introduced through the base material feed bore 50 into the first container part 11a and also into the second container part 11b.

Some embodiments of the invention relate to a method for manufacturing a three-dimensional object. In the course of the method according to the invention, a build base is held by means of a fixing means 12 and a build base material solidifying under the effect of irradiation by a grow radiation pattern is filled into a container.

In the method the build base is adapted for dividing the container into a first container part and a second container part, and has a first grow side facing the first container part 11a and a second grow side facing the second container part 11b. In the course of the method, the build base is grown from the first grow side thereof by means of a first grow radiation pattern generated by the first radiation emission unit 10a of a radiation emission arrangement adapted for generating a grow radiation pattern, and the build base is grown from the second grow side thereof by means of a second radiation emission unit 10b of the radiation emission arrangement.

An embodiment of method according to the invention is illustrated in FIGS. 7-11. In this embodiment the method is carried out by means of an apparatus wherein the first radiation emission unit 10a comprises a first radiation source 34a and the second radiation emission unit 10b comprises a second radiation source 34b. In the apparatus applied in the present embodiment of the method according to the invention the radiation emission units 10a, 10b comprise permeable elements 40 being arranged between the radiation sources 34a, 34b and the corresponding grow sides being adapted for letting through radiation emitted by the radiation sources 34a, 34b, being adapted for determining imaging location of the grow radiation pattern, and being adapted for inhibiting or can be made to inhibit the adhesion of the build base material to their sides facing the grow sides. In the apparatus applied, the radiation emission unit 10a is arranged in the first container part 11a such that it is movable in a direction perpendicular to the first grow side, and the second radiation emission unit 10b is arranged in the second container part 11b such that it is movable in a direction perpendicular to the second grow side. Also, in the apparatus applied the first grow side of the build base is arranged opposite the second grow side, and the fixing means 12 is adapted for holding the build base with respect to the apparatus in a horizontal position such that the grow sides face upwards and downwards. Furthermore, in this embodiment, such an apparatus is applied wherein the side walls 14a, 14b of the container parts 11a, 11b have a right prism mantle shape or cylinder mantle shape, and the container parts 11a, 11b are connected to each other at one end by the fixing means 12, and the radiation emission units 10a, 10b are adapted to be introduced into the container parts 11a, 11b from the direction of the other ends of the container parts 11a, 11b. Furthermore, in the apparatus applied the container parts 11a, 11b are connected to each other by means of an annular fixing means 12 that is coaxial with the side walls 14a, 14b of the container parts, and has a shape fitting to the side walls, and the portion of the radiation emission units 10a, 10b that is provided with a permeable element 40 is arranged to fit into the internal space of the fixing means 12. As with the previous figures, in FIGS. 7-11 such an apparatus is illustrated.

Figure 7:
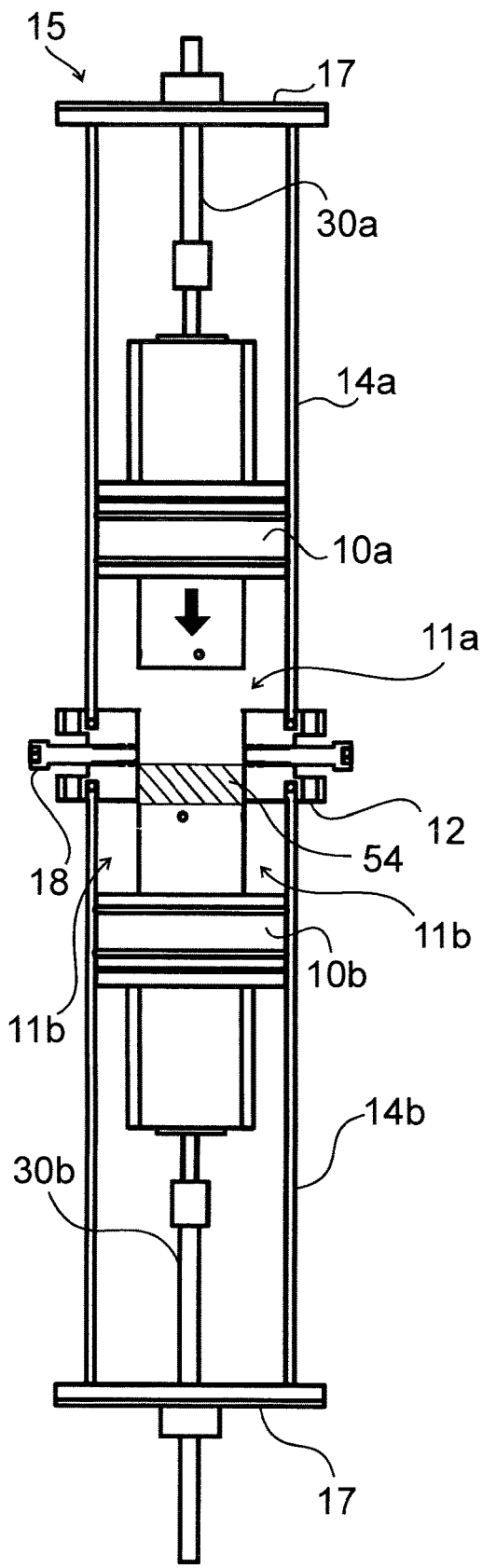
FIG. 7 is a schematic side view illustrating a first state of the method according to the invention carried out by means of the apparatus shown in FIG. 1.

In the course of the method carried out by means of such an apparatus, preferably prior to being held by the fixing means 12 the build base is manufactured from the build base material carrying out the following steps. The first one of such steps is illustrated in FIG. 7, according to which the permeable element 40 of the lower-situated one of the first radiation emission unit 10a and the second radiation emission unit 10b is positioned such that it extends into or borders the internal space of the annular (ring-shaped) fixing means 12. In the arrangement shown in the figure the radiation emission unit 10b is situated lower, and—as illustrated in the figure—this radiation emission unit 10b is positioned such that it bounds the internal space of the fixing means 12 from the direction of its bottom plane.

In case the bottom radiation emission unit is positioned directly under the base material feed bore 50 the initial build base material demand can be minimized.

The appropriate radiation emission unit is positioned such that it extends into or bounds the internal space in order that a "pool" is formed for the build base material (and that support is provided for the object part about to be manufactured), which is bounded from below by the respective radiation emission unit and from the sides by the fixing means 12 as it is illustrated also in FIG. 7. Accordingly, the appropriate radiation emission unit may also extend into the internal space of the annular fixing means, the only difference from the bounding arrangement is that thereby a more shallow "pool" can be established for the build base material.

In the next step—also illustrated in FIG. 7—build base material 54 is placed on the permeable element of the lower-situated radiation emission unit 10b and moving the upper-situated one of the first radiation emission unit 10a and the second radiation emission unit 10b closer to the permeable element of the lower-situated radiation emission unit 10b such that the build base material situated between the radiation emission units 10a, 10b can be solidified across its entire volume applying the radiation pattern of the upper radiation emission unit 10a.

On the one hand, this step may be performed by filling such a low amount of build base material between the radiation emission units 10a, 10b that fills that spatial region which has a thickness low enough that the radiation emission unit 10a is able to solidify the material comprised therein.

Alternatively, a larger amount of build base material is filled into the "pool" formed as described above before starting to bring the radiation emission units 10a, 10b closer to each other, but as the upper radiation emission unit 10a is brought closer, a certain amount of build base material is displaced from the pool and thereby the radiation emission unit 10a can be brought so close to the radiation emission unit 10b as the build base material situated between them can be solidified applying the radiation pattern emitted by the radiation emission unit 10a.

Preferably, in all cases the build base material is allowed to pass between the inside edge of the fixing means 12 and the portion of the radiation emission unit 10a which extends into the internal space of the fixing means 12. In this case the displaced build base material enters further portions of the first container part 11a. The provision of this build base material level has no disadvantages since it is ensured that the instant cross section to be solidified is completely covered by the build base material.

In case such permeable elements are applied that can be made to inhibit the adhesion of the build base material, the feed of separator gas into the internal space of the upper-situated radiation emission unit 10a is to be started simultaneously with solidification. Also, adhesion to the permeable element of the radiation emission unit 10b has to be prevented by the adequately timed filling of the internal space of the radiation emission unit 10b with gas and by applying overpressure in said internal space.

After the material situated between the radiation emission units 10a, 10b has solidified (of course this object section is also provided by means of the appropriate grow radiation pattern with a structure corresponding to the object to be built) the upper radiation emission unit 10a is moved upwards (in this embodiment layer separation is not necessary since the build base material is prevented from adhering to the permeable element), and by generating a series of new grow radiation patterns (applying continuous illumination of cross section patterns) at the continuously ascending permeable element the desired geometry is built on the upper face of the bottom radiation emission unit 10b (i.e. on its permeable element), while the bottom radiation emission unit remains stationary.

Figure 8:
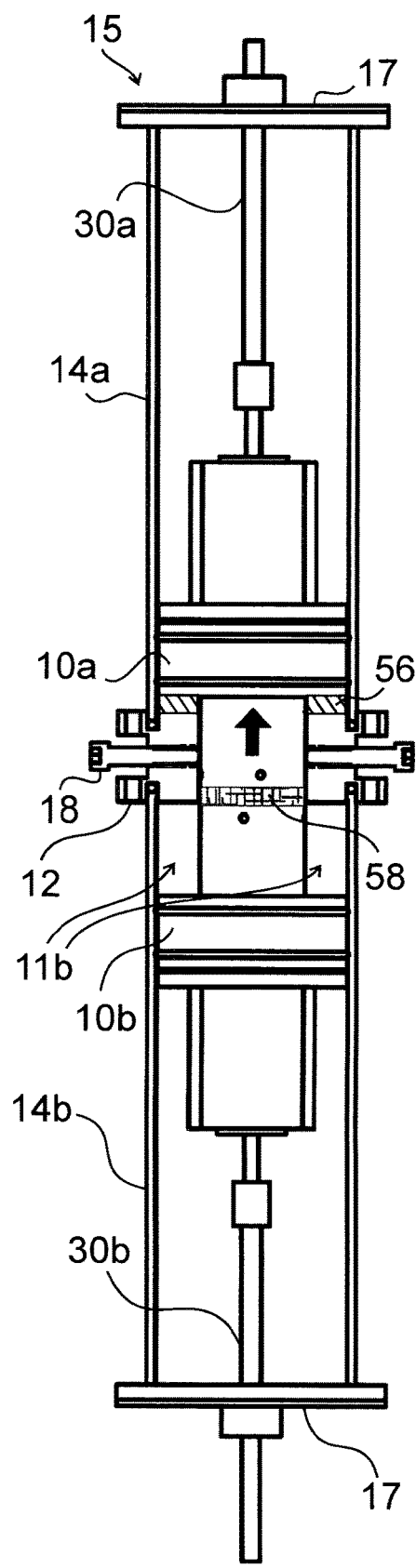
FIG. 8 is a schematic side view illustrating a second state of the method according to the invention carried out by means of the apparatus shown in FIG. 1.

FIG. 8 illustrates a further state of the method. At this stage an object 58 has already been built, with the object being fully immersed in the build base material since, as shown in the figure, there is enough build base material 56 for filling some into the spatial region above the fixing means 12. In the case illustrated by FIG. 8 the build base has not yet been finished, since the object 58 ends lower than the level of the fixing pins 18 which therefore cannot be utilized for fixing it. In this situation the object 58 rests on the permeable element 40 of the radiation emission unit 10b, and is built exclusively by means of the radiation emission unit 10a. In this case therefore the object is grown at one side only because it cannot yet be held and thus cannot be grown simultaneously at both sides.

In the step illustrated also in FIG. 8 the initially introduced build base material, adapted to be solidified over its entire volume, is solidified, and the thus solidified build base material is grown applying the radiation pattern of the upper-situated radiation emission unit 10a by moving the upper-situated radiation emission unit 10a upwards—while providing that the build base being built has a shape that can be held (grabbed) by the fixing means 12—until the build base can be held by the fixing means 12, and the subsequent steps of the method are carried out after holding the build base by the fixing means. The height of the build base required for successfully holding it can also be adjusted by the accurate positioning the bottom radiation emission unit.

As spelled out above, therefore, during the build (grow) process of the build base it is provided that in its "grown" state the build base has a shape that can be held by the fixing means. This can be ensured by applying a holding rim 70 illustrated in FIG. 12, or by a rim having only holding portions on its circumference instead of a holding edge extending along its entire circumference.

In case the three-dimensional object to be built has a shape that can be held, the build base—which is preferably grown—may consist exclusively of such shapes that will constitute portions of the three-dimensional object (i.e. a holding rim and grid that would have to be removed later are not included) and that can also be held by the fixing means.

Therefore, by carrying out the above presented steps for manufacturing a build base, preferably a build base comprising a holding rim 70 arranged at its the periphery, is grown, and at least one connection element adapted for connecting the holding rim 70 to at least one object section 74 produced as a portion of the three-dimensional object is grown. In a further embodiment, a connection element forming a grid 72 is grown.

To provide that the holding rim 70 has adequate strength, the holding rim 70 is grown to a height of approximately 5-20 mm in the direction of the motion of the radiation emission units (above that height only such grow radiation patterns [cross section images] are exposed which belong to the useful geometry of the three-dimensional object). As soon as the desired height is reached (it may be lower than specified above) the build base is declared completed and is held applying the fixing means 12.

After that, compressed air is fed also into the internal space of the bottom radiation emission unit 10b (only in specific cases, in order to prevent build base material from adhering to the permeable element 40 of the bottom radiation emission unit 10b already during the build process of the build base, it may become necessary to start the feed of compressed air earlier than that) which at this point starts to descend, producing new grow radiation patterns at new grow cross sections (i.e. applying continuously changing cross section patterns).

In FIG. 9 a subsequent state of the build process is illustrated. At this stage the build process of an object 62 (having greater height than the object 58 of FIG. 8) has been completed, with build base material 60 being contained in the container parts 11a, 11b. As indicated by the distribution of the build base material 60, the fillable volumes of the container parts 11a, 11b are completely filled with build base material. Then the build base is in a held state, and accordingly the build base has been started to be built from below, i.e. the downward motion of the radiation emission unit 10b can be started and a three-dimensional object can be built from below through the permeable element 40.

As it is also shown in FIG. 9, the three-dimensional object is simultaneously built also from above applying the radiation emission unit 10a. In FIG. 9 it is also shown that the three-dimensional object 62 is held in the fixing means 12 by means of fixing pins 18. The held three-dimensional object 62 is shown in the figure as if it was penetrated by the fixing pins 18. Naturally, the three-dimensional object 62 can also be held such that the fixing pins 18 do not penetrate into the object but only hold it at its circumference.

In FIG. 10 a still further state of the method for manufacturing a three-dimensional object is illustrated, at which a three-dimensional object 66 already has a greater length compared to previous objects, while the separated volume of the container part 11a (bounded at the top by the radiation emission unit 10a), as well as the separated volume of the container part 11b (bounded from below by the radiation emission unit 10b) is still filled with build base material 64. The arrows shown at the radiation emission units 10a, 10b indicate that the units are moved upwards and downwards.

Figure 11:
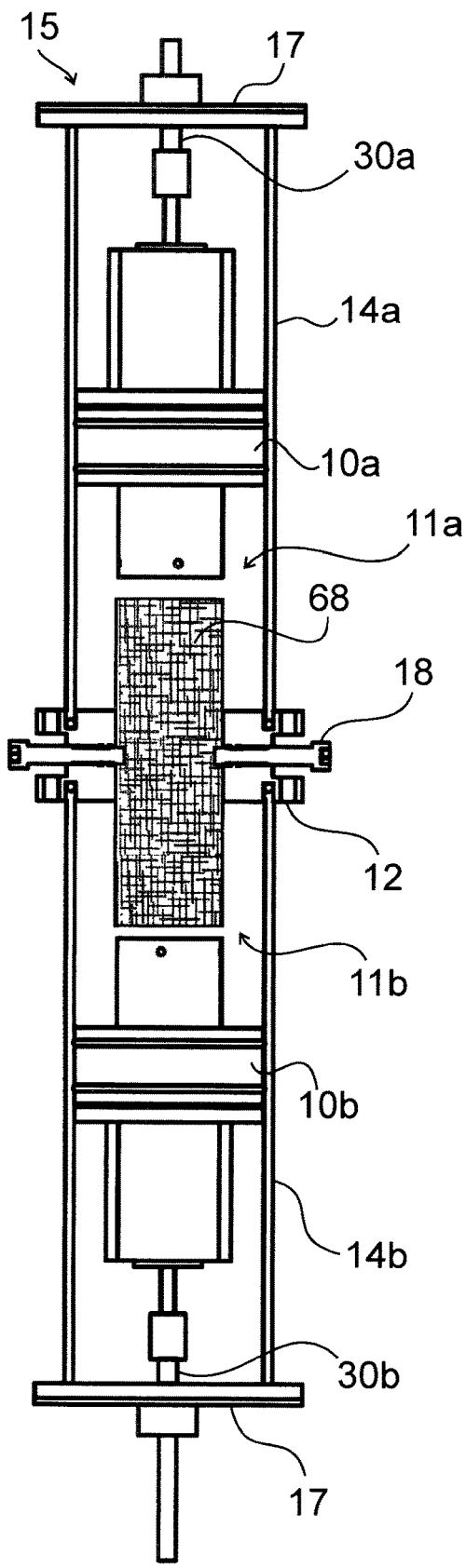
FIG. 11 is a schematic side view illustrating a fifth stage of the method according to the invention carried out by means of the apparatus shown in FIG. 1.

In FIG. 11 the apparatus is shown in a state wherein the method according to the invention has already been completed; accordingly, the radiation emission units 10a, 10b continue their motion (while generating appropriate grow radiation patterns) until the three-dimensional object—being previously designed and then implemented applying the radiation patterns—is completed.

FIG. 11 illustrates a state wherein the radiation emission units 10a and 10b have already been distanced from a three-dimensional object 68 and the build base material has been discharged from the container parts 11a, 11b. In FIG. 1 there is shown the discharge channel 20 through which the build base material can be discharged from the container parts 11a, 11b in case the radiation emission unit 10b is lowered below the outlet opening.

As it is schematically shown also in FIG. 11, in most cases the three-dimensional object 68 has a shape which allows that the residual build base material can flow around the object. Then the build base material also flows out from the upper container part 11a into the container part 11b, and from there it is discharged through the discharge channel 20. If the three-dimensional object 68 (of which only a schematic view can be seen in FIG. 11) does not have a structure allowing of build base material to drain through, bores adapted for putting the two container parts into communication may also be arranged in the fixing means 12. In the case it is not desirable to include such bores, the residual build base material may also be drained separately from the container parts 11a and 11b.

After removing the radiation emission units 10a, 10b and discharging the residual build base material the completed three-dimensional object can be removed from the apparatus. As shown in FIG. 1, the residual build base material is discharged into the bottom (drain) container 24, from where it is recycled into the upper tank 19 by the pump 26. After draining the container parts 11a, 11b the side walls 14a, 14b can preferably be opened, and the three-dimensional object 68 can be removed.

The three-dimensional object is shown in all figures with a schematic shape, of course the apparatus and method according to the invention are not limited to building/growing a given three-dimensional object, such as the exemplary three-dimensional object illustrated in FIG. 12.

The three-dimensional object to be manufactured can be designed in advance e.g. applying a computer, and can be mapped to a series of radiation patterns with which the build base material is sequentially illuminated (achieving that it solidifies at the appropriate locations), thereby producing the completed three-dimensional object.

The method according to the invention can also be carried out by applying a base plate as the build base. The base plate may also have a perforated configuration such that the portion allowing of its retention and the portions not needed any more after finishing the object can be easily removed. It is particularly preferable to apply a base plate because, in contrast to the embodiment wherein the method also includes the manufacturing of the build base, applying a base plate the build process can be started simultaneously at both grow sides after the plate has been gripped firmly. Applying a base plate is preferable also because such base plates—applicable as a build base—can be made available for sale in kits and thus can be purchased easily.

In this case it is the base plate which is held (gripped) by the fixing means 12, by way of example applying fixing pins 18. In this configuration the object is built at both sides of the base plate, and accordingly the base plate will be part of the three-dimensional object to be built.

It is still more preferable to manufacture the build base applying the apparatus according to the invention according to one embodiment of the method, since thereby the three-dimensional object can be designed in such a manner that it does not by any means comprise such portions that were included only by necessity (such as certain parts of the base plate). The base plate does not necessarily comprise such portions that are interfering from the aspect of the finished three-dimensional object.

The grid 72 (support mesh) can be removed from the object sections 74 (print product) together with the holding rim 70 (the thickness of the holding rim 70 is typically 1-10 mm, and according to the growing process it is made of the same material as the object sections 74. One the one hand, the grid 72 is adapted to provide connection between the holding rim 70 and the object sections 74, while it can be easily removed after the three-dimensional object has been finished (i.e. thereby the useful part of the geometry can easily be obtained). Accordingly, the grid 72 is configured to comprise thin pieces of material.

As shown in the figures, the container parts (firstly the upper one, followed by the bottom) are filled up with build base material as the printing process is started, simultaneously with the radiation emission units (building heads) being moved further away from each other, providing that the build base material is present inside the entire fillable volume of the container parts. The build base material may be fed into the upper container part in such a manner that it covers only to the required extent the area to be irradiated (illuminated) at that particular instant.

It is also conceivable that the material is introduced only to the appropriate regions inside the containers (i.e. to the grow cross section, to the area to be illuminated) by spray nozzles and feeders that are, by way of example, arranged in the building heads (radiation emission units). Thereby the amount of build base material that has to be on supply for the build process (printing) can be significantly reduced. The two solutions for feeding the build base material into the apparatus can preferably be applied in combination. In an embodiment of the method according to the invention, therefore, a base material feeding means (spray nozzle, feeder) is applied for conveying the build base material, at least at one of the radiation emission units, directly into a grow volume (grow space part) comprising the grow radiation pattern corresponding to the given radiation emission unit.

As discussed above, this can be combined with that the method is carried out—or, in case every container part is arranged as specified below the method can be exclusively carried out—applying an apparatus wherein at least one of the radiation emission units is formed to separate a fillable volume from the container part corresponding thereto such that the build base material is prevented from escaping from the fillable volume, and the fillable volume is filled with build base material at the start of the method, and the filled-up state thereof is maintained during growing. By carrying out the method in such a manner an apparatus is applied wherein further each radiation emission unit comprises one radiation source, each of the radiation emission units comprises a permeable element being arranged between the corresponding radiation source and the corresponding grow side, being adapted for letting through radiation emitted by the corresponding radiation source, being adapted for determining imaging location of the grow radiation pattern, being adapted for inhibiting or can be made to inhibit the adhesion of the build base material to its side facing the corresponding grow side, and the radiation emission units are arranged in the respective container parts such that they are movable in a direction perpendicular to the grow side corresponding to them, and the side walls of the container parts have a right prism mantle or cylinder mantle shape, and the container parts are connected to each other at one end by the fixing means, and the radiation emission units being adapted to be introduced into the container parts from the direction of the other ends of the container parts. In an embodiment of the method the filled-up state is maintained by applying material conveying auxiliary means (e.g. a pump or screw extruder) arranged in the inlet channel of the build base material.

The invention is, of course, not limited to the preferred embodiments described in details above, but further variants, modifications and developments are possible within the scope of protection determined by the claims.

The invention claimed is:

1. An apparatus for building three-dimensional objects, the apparatus comprising:
 a container configured to receive a build base material that solidifies when irradiated by a grow radiation pattern;
 a build base that is arranged between a first container part and a second container part and divides the container into the first container part and the second container part, the build base including a first grow side that faces in a first direction toward the first container part and a second grow side that faces in a second direction different from the first direction and toward the second container part;
 a first radiation emission unit configured to generate a first grow radiation pattern for growing the build base from the first grow side in the first direction; and
 a second radiation emission unit configured to generate a second grow radiation pattern for growing the build base from the second grow side in the second direction.

2. The apparatus of claim 1 wherein the first radiation emission unit comprises a first radiation source, and the second radiation unit comprises a second radiation source.

3. The apparatus of claim 2 wherein:
 each of the radiation emission units further comprises a permeable element arranged between the respective radiation source and the corresponding grow side of the build base;
 each of the radiation emission units is arranged in the respective container part such that the radiation emission unit is movable in a direction perpendicular to the respective grow side of the build base; and
 each permeable element is configured to let through radiation emitted by the respective radiation source, determine an imaging location of the respective grow radiation pattern, and inhibit, fixedly or selectively, adhesion of the build base material to the respective grow side of the build base.

4. The apparatus of claim 3 wherein at least one of the permeable elements is made of an anti-adhesion material that prevents adhesion of the build base material.

5. The apparatus of claim 3 wherein at least one of the permeable elements is permeable to a separator gas and the respective radiation emission unit includes an internal space configured to receive pressurized separator gas, the internal space being located between the at least one permeable element and the radiation source of the respective radiation emission unit such that the separator gas inhibits adhesion of the build base material to the at least one permeable element.

6. The apparatus of claim 5 wherein the separator gas is oxygen.

7. The apparatus of claim 3 further comprising a fixing member, wherein
 each of the container parts includes a first end facing the build base, a second end facing away from the build base, and a side wall having a right prism mantle or cylinder mantle shape,
 the container parts are connected to each other at their first ends by the fixing member, and
 the radiation emission units are configured to be introduced into their respective container parts from the direction of the second ends.

8. The apparatus of claim 7 wherein at least one of the radiation emission units is configured to separate a fillable volume from the container part corresponding thereto such that the build base material is prevented from escaping from the fillable volume.

9. The apparatus of claim 8 wherein the radiation units include side walls that are fitted to the side walls of the respective container parts, and further comprising:
 sealing rings arranged on the side walls of the radiation emission units and configured to provide sealing between the radiation emission units and the container parts that prevents the build base material from escaping from the fillable volume.

10. The apparatus of claim 1 further comprising an additional radiation emission unit, wherein:
 the build base is further configured to divide the container into at least one additional container part, and includes at least one additional grow side facing in an additional direction different from both the first direction and the second direction and toward the at least one additional container part, and
 the at least one additional radiation emission unit is configured to generate at least one additional grow radiation pattern for growing the build base from the at least one corresponding additional grow side in the additional direction.

11. The apparatus of claim 1 wherein the first grow side of the build base is arranged opposite the second grow side.

12. The apparatus of claim 11 further comprising a fixing member configured to hold the build base in a horizontal position such that the grow sides face upwards and downwards, respectively, with respect to the apparatus.

13. The apparatus of claim 12 wherein the fixing member includes an annular member that connects the container parts to each other, and the annular member is arranged coaxially with, and has a shape fitting to, the side walls of the container parts.

14. The apparatus of claim 13 wherein the fixing member includes an internal space, and further comprising:
fixing pins arranged on a periphery of the fixing member, each of the fixing pins having a radial axis and being configured to fix the build base inside the internal space of the fixing member.

15. The apparatus of claim 14 wherein:
each of the radiation emission units further comprises a radiation source and a permeable element arranged between the radiation source and the corresponding grow side of the build base, and
a portion of the radiation emission unit containing the permeable element is configured to fit into the internal space of the fixing member.

16. The apparatus of claim 1 further comprising:
a first base material container configured to fill the first and second container parts with the build base material via an inlet channel;
a second base material container configured to discharge the build base material from the first and second container parts via a discharge channel; and
a pump configured to feed the build base material from the second base material container to the first base material container, the pump being connected to the first and second build base containers via the respective inlet and discharge channels.

17. The apparatus of claim 1 wherein the build base material is a liquid plastic material such as photopolymer configured to be solidified by irradiation with the grow radiation pattern, or a powder-like base material configured to be at least partially melted, sintered, or activated by the irradiation with the grow radiation pattern and to solidify after the irradiation has been finished.

18. A method for manufacturing a three-dimensional object, the method comprising:
providing a container that receives a build base material which solidifies when irradiated by a grow radiation pattern;
positioning a build base in the container so that the build base is arranged between a first container part and a second container part and divides the container into the first container part and the second container part, the build base including a first grow side that faces in a first direction toward the first container part and a second grow side that faces in a second direction different from the first direction and toward the second container part;
growing the build base from the first grow side using a first grow radiation pattern provided by a first radiation emission unit in the first direction; and
growing the build base from the second grow side using a second grow radiation pattern provided by a second radiation emission unit in the second direction.

19. The method of claim 18 further comprising:
conveying the build base material directly into a grow volume corresponding to at least one of the radiation emission units.

20. The method of claim 18 wherein:
each radiation emission unit comprises a radiation source;
each of the radiation emission units further comprises a permeable element arranged between the respective radiation source and the corresponding grow side of the build base;
each of the radiation emission units is arranged in the respective container part such that the radiation emission unit is movable in a direction perpendicular to the respective grow side of the build base;
each permeable element is configured to let through radiation emitted by the respective radiation source, determine an imaging location of the respective grow radiation pattern, and inhibit, fixedly or selectively, adhesion of the build base material to the respective grow side of the build base;
each of the container parts includes a first end facing the build base, a second end facing away from the build base, and a side wall having a right prism mantle or cylinder mantle shape;
the container parts are connected to each other at their first ends by a fixing member; and
the radiation emission units are configured to be introduced into their respective container parts from the direction of the second ends.

21. The method of claim 20 wherein:
at least one of the radiation emission units is configured to separate a fillable volume from the container part corresponding thereto such that the build base material is prevented from escaping from the fillable volume; and
the fillable volume is initially filled with the build base material, and maintained in a filled state during growing of the build base.

22. The method of claim 21 wherein maintaining the fillable volume in the filled state comprises feeding the build base material to the fillable volume via an inlet channel.

23. The method of claim 20 wherein the first grow side of the build base is arranged opposite the second grow side, the fixing member is an annular member having an internal space, and further comprising:
holding the build base in a horizontal position such that the grow sides face upwards and downwards, respectively, with respect to an apparatus comprising the container parts and the fixing member;
connecting the container parts to each other using the fixing member that is arranged coaxially with, and has a shape fitting to, side walls of the container parts; and
a portion of the radiation emission unit containing the permeable element is configured to fit into the internal space of the fixing member.

24. The method of claim 23 wherein the first radiation emission unit is situated below the second radiation emission unit, and further comprising growing the build base from the build base material by:
positioning the permeable elements of the radiation emission units so that the permeable elements extend into or border the internal space of the fixing member;
placing build base material on the permeable element of the first radiation emission unit and moving the second radiation emission unit toward the permeable element of the first radiation emission unit so that the build base material situated between the radiation emission units is solidified across its entire volume by the second grow radiation pattern; and
growing the solidified build base material using the second grow radiation pattern by moving the second radiation emission unit upward so that the build base being grown has a shape that conforms with the internal space the fixing member until the build base is of sufficient thickness to that the build base can be held by the fixing member during manufacture of the three-dimensional object.

25. The method of claim 24 wherein growing the build base comprises arranging holding rim at a periphery of the build base, and connecting the holding rim to at least one object part manufactured as a part of the three-dimensional object using at least one connection element.

26. The method of claim 25 further comprising growing a connection element that forms a grid.

27. The method of claim 18 wherein further comprising using a base plate as the build base.

* * * * *